United States Patent
Ehring et al.

(10) Patent No.: US 12,411,074 B2
(45) Date of Patent: Sep. 9, 2025

(54) OPTICAL FLOW CELL FOR BIOPROCESSING

(71) Applicant: CYTIVA SWEDEN AB, Uppsala (SE)

(72) Inventors: Hanno Ehring, Uppsala (SE); Klaus Gebauer, Uppsala (SE)

(73) Assignee: CYTIVA SWEDEN AB, Uppsala (SE)

( * ) Notice: Subject to any disclaimer, the term of this patent is extended or adjusted under 35 U.S.C. 154(b) by 250 days.

(21) Appl. No.: 17/997,644

(22) PCT Filed: Jun. 10, 2021

(86) PCT No.: PCT/EP2021/065714
§ 371 (c)(1),
(2) Date: Oct. 31, 2022

(87) PCT Pub. No.: WO2021/254889
PCT Pub. Date: Dec. 23, 2021

(65) Prior Publication Data
US 2023/0221241 A1  Jul. 13, 2023

(30) Foreign Application Priority Data
Jun. 16, 2020 (GB) .................. 2009138

(51) Int. Cl.
*G01N 21/05* (2006.01)
*G01N 21/15* (2006.01)

(52) U.S. Cl.
CPC ............ *G01N 21/05* (2013.01); *G01N 21/15* (2013.01); *G01N 2021/052* (2013.01); *G01N 2201/0245* (2013.01)

(58) Field of Classification Search
CPC .... G01N 21/05; G01N 21/0303; G01N 21/59; G01N 21/255; G01N 2201/0853;
(Continued)

(56) References Cited

U.S. PATENT DOCUMENTS 5,452,082 A * 9/1995 Sanger .................. G01N 21/05
                                                    356/440
6,747,740 B1   6/2004 Leveille et al.
(Continued)

FOREIGN PATENT DOCUMENTS

JP     2004177242 A  *  6/2004
JP     2005221298 A     8/2005
(Continued)

OTHER PUBLICATIONS

PCT International Search Report and Written Opinion for PCT/EP2021/065714, mailed, Sep. 10, 2021 (13 pages).
(Continued)

*Primary Examiner* — Sang H Nguyen
(74) *Attorney, Agent, or Firm* — Eversheds-Sutherland (US) LLP

(57) ABSTRACT

Disclosed is an optical flow cell and a method for bioprocessing applications. The optical flow cell comprises a fluid inlet, a fluid outlet, and a fluid flow channel provided between said fluid inlet and said fluid outlet. The optical flow cell also comprises an output optical waveguide configured to emit light into said fluid flow channel, and a collector optical waveguide to collect light from said fluid flow channel. An optical path-length adjuster for varying the optical pathlength between said output optical waveguide and said collector optical waveguide is also provided.

16 Claims, 5 Drawing Sheets

(58) Field of Classification Search
CPC ....... G01N 2201/08; G01N 2021/6481; G01N 35/1074; G01N 2035/00237; G01N 2035/1037; G01N 2035/1069; G01N 21/15; G01N 2201/0245; G01N 2021/052
USPC .................. 356/246, 335–343, 432–440, 73; 250/227.11; 385/12
See application file for complete search history.

(56) References Cited

U.S. PATENT DOCUMENTS

| | | | | |
|---|---|---|---|---|
| 7,808,641 | B2* | 10/2010 | Salerno | G01N 21/00 356/440 |
| 9,952,350 | B1 | 4/2018 | Difoggio | |
| 2002/0154309 | A1* | 10/2002 | Walker | G01N 21/05 356/436 |
| 2009/0059332 | A1* | 3/2009 | DiFoggio | G01N 21/0303 356/73 |
| 2013/0215412 | A1 | 8/2013 | Wynn | |

FOREIGN PATENT DOCUMENTS

| | | |
|---|---|---|
| JP | 2006194775 A | 7/2006 |
| JP | 2009-180665 A | 8/2009 |
| JP | 2013-513783 A | 4/2013 |
| JP | 2014209063 A | 11/2014 |
| WO | 2009032981 A1 | 3/2009 |
| WO | 2012062829 A1 | 5/2012 |

OTHER PUBLICATIONS

GB Search Report for GB2009138.5, mailed Mar. 10, 2021 (2 pages).
Japanese Office Action for JP Application No. 2022-577679, dated Feb. 18, 2025, 6 pages.

* cited by examiner

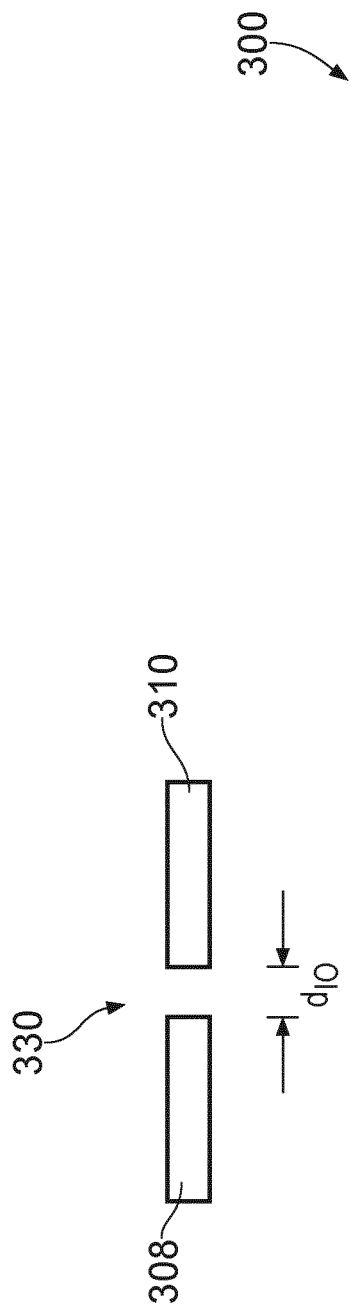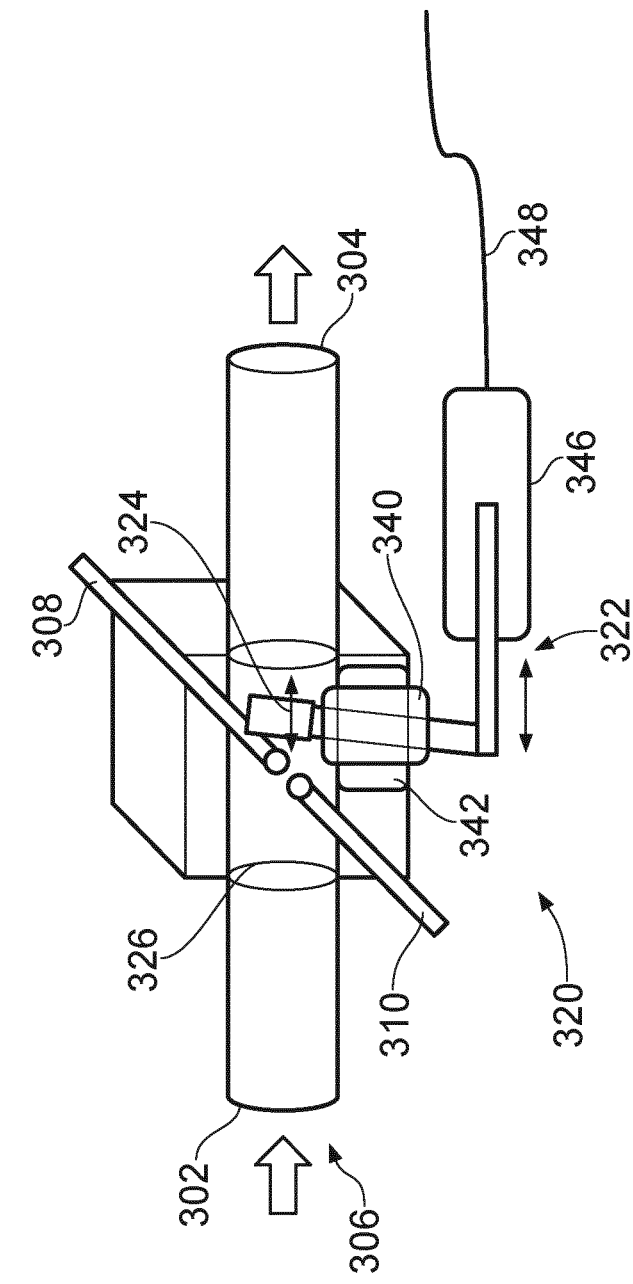
FIG. 3A
FIG. 3B

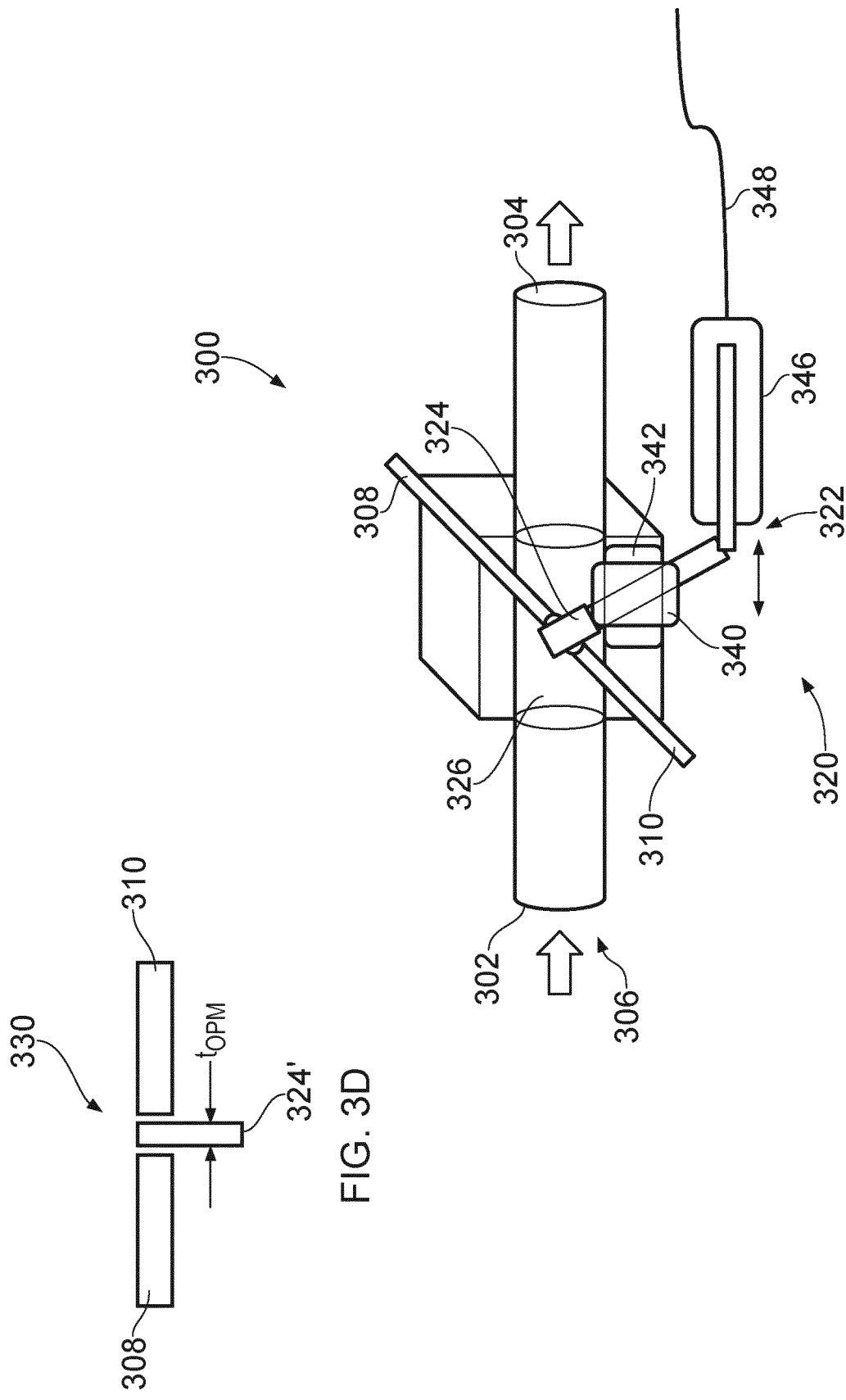

OPTICAL FLOW CELL FOR BIOPROCESSING

CROSS REFERENCE TO RELATED APPLICATIONS

This application claims the priority benefit of PCT/EP2021/065714, filed Jun. 10, 2021, which claims the priority benefit to GB Application No. 2009138.5, filed Jun. 16, 2020, the entire contents of which are incorporated herein by reference.

TECHNICAL FIELD

The present invention relates to an optical flow cell for bioprocessing applications. More particularly, the present invention relates to an optical flow cell for bioprocessing that has a variable optical path length provided therein.

BACKGROUND

Optical measuring devices are used within a variety of technical fields where a fluid, or fluid mixture, is caused to flow through an optical flow cell that is then used to determine the presence or absence of a substance and/or a concentration of a substance within the fluid or fluid mixture.

For example, WO 2019/229201 A1 describes an optical flow cell that is suitable for use in various bioprocessing applications, such as chromatography, filtering, etc. The contents of WO 2019/229201 A1 are furthermore hereby incorporated by reference herein to the maximum extent permissible.

Fixed optical path length optical flow cells are designed for optimal operation in order to detect substances in a fluid over a predetermined range of concentrations. Generally, this design operating range will correspond to an absorption region having a linear relationship between optical absorbance and the concentration of an absorbing substance, such that the amount of light passing though the fluid in a cavity of the optical flow cell adheres to the Beer-Lambert law.

However, for fluids where the concentration of absorbing substances is outside of the normal operating range, then a non-linear absorption response may occur which can lead to inaccuracies in measurements made when using the optical flow cell. This may occur typically with high concentrations of the absorbing substances that are being analysed, for example. In this situation, it may be desirable to shorten the pathlength of the flow cell.

Moreover, should an optical path length in an optical flow cell be too short, with low sample concentrations, then a poor signal to noise ratio can arise. In such a situation, it may be desirable to increase the pathlength of the flow cell.

Therefore, in order to increase the range of measurements that can be made using optical flow cells and/or to adapt to changes in absorbance over time, various techniques have been developed to provide either a variable optical path or multiple alternative optical paths in optical flow cells.

Examples of various systems with variable optical path lengths are shown, for example, in U.S. Pat. Nos. 6,747,740, 6,188,474 and 7,808,641.

A system that uses fixed multi-light optical path flow cells is described in U.S. Pat. No. 5,214,593.

For example, one technique uses a moveable optical fibre in order to vary an optical pathlength in a single optical flow cell. However, this technique is relatively slow, such that an accurate real-time measurement across a large range of concentrations (e.g. as is necessary with a relatively fast-flowing fluid) is not possible.

An alternative way to vary the optical pathlength in a single optical flow cell is to vary the optical pathlength to by moving a physical boundary within the optical flow cell itself, for example, by providing an optical flow cell of adjustable cell length. However, such optical flow cells cannot generally be adjusted quickly enough to enable optical multiplexing. Further, such optical flow cells are difficult to adjust and control so as to provide high accuracy, repeatable length optical path lengths, etc.

Performing absorbance measurements using systems provided with multiple optical path lengths, having respective predefined optical lengths, is also a technique used to increase the dynamic range over which absorption measurements can be accurately made. However, such systems require the use of multiple flow cells and/or multiple optical fibre channels/systems.

Consequently, this drives up the cost and complexity of such systems in proportion to the number of optical path lengths used.

It is thus an objective of the present invention to address the aforementioned shortcomings of known optical flow cells and/or optical flow cell systems.

SUMMARY OF THE INVENTION

Various aspects and embodiments of the present invention are directed towards addressing the shortcomings of the known devices and systems that are described above.

More specifically, the present invention is defined by the appended claims.

According to a first aspect, the present invention provides an optical flow cell for bioprocessing comprising a fluid inlet, a fluid outlet, a fluid flow channel provided between said fluid inlet and said fluid outlet, an output optical waveguide configured to emit light into said fluid flow channel, a collector optical waveguide configured to collect light from said fluid flow channel and an optical pathlength adjuster for varying the optical pathlength in any fluid that is between said output optical waveguide and said collector optical waveguide.

According to a second aspect, the present invention also provides a removable chamber module for use in an optical flow cell. The removable chamber module comprises a fluid flow channel therein, an output optical waveguide coupler for optically connecting the fluid flow channel to the output optical waveguide and a collector optical waveguide coupler for optically connecting the fluid flow channel to the collector optical waveguide. The removable chamber module also comprises an optical pathlength modifier and an optical pathlength modifier actuator provided in the channel, wherein the optical pathlength modifier actuator is operable to move the optical pathlength modifier within the channel.

According to a third aspect, the present invention provides a method for measuring an optical density of a substance within a fluid or fluid mixture using an optical flow cell. The method comprises: i) emitting light from an output optical waveguide into a fluid flow channel; ii) collecting light from the fluid flow channel using a collector optical waveguide; iii) determining a first optical density of the substance based upon said collected light; and iv) if said determined first optical density lies outside of a linear operating range of the optical flow cell, then changing an optical path length within the fluid or fluid mixture in the fluid flow channel so as to change a value of the first optical density to a value corresponding to a second optical density lying within said linear operating range.

By providing an optical pathlength adjuster, an optical pathlength modifier and/or by changing an optical path length within an optical flow cell, various aspects and embodiments of the present invention are able to adjust an optical pathlength in a fluid that is in the optical flow cell without the need to provide multiple separate optical waveguide channels, and whilst simultaneously providing fast and accurately controllable optical pathlength variation.

Various other advantages and benefits of the present invention and embodiments thereof will also become apparent from the following description and drawings, in which:

BRIEF DESCRIPTION OF THE DRAWINGS

FIG. 3A schematically shows an optical flow cell according to another embodiment of the present invention in a first operating condition;

FIG. 3B shows an optical path within the optical flow cell of FIG. 3A in the first operating condition;

FIG. 3C schematically shows the optical flow cell of FIG. 3A in a second operating condition;

FIG. 3D shows an optical path within the optical flow cell of FIG. 3C in the second operating condition.

DETAILED DESCRIPTION

Figure 1:
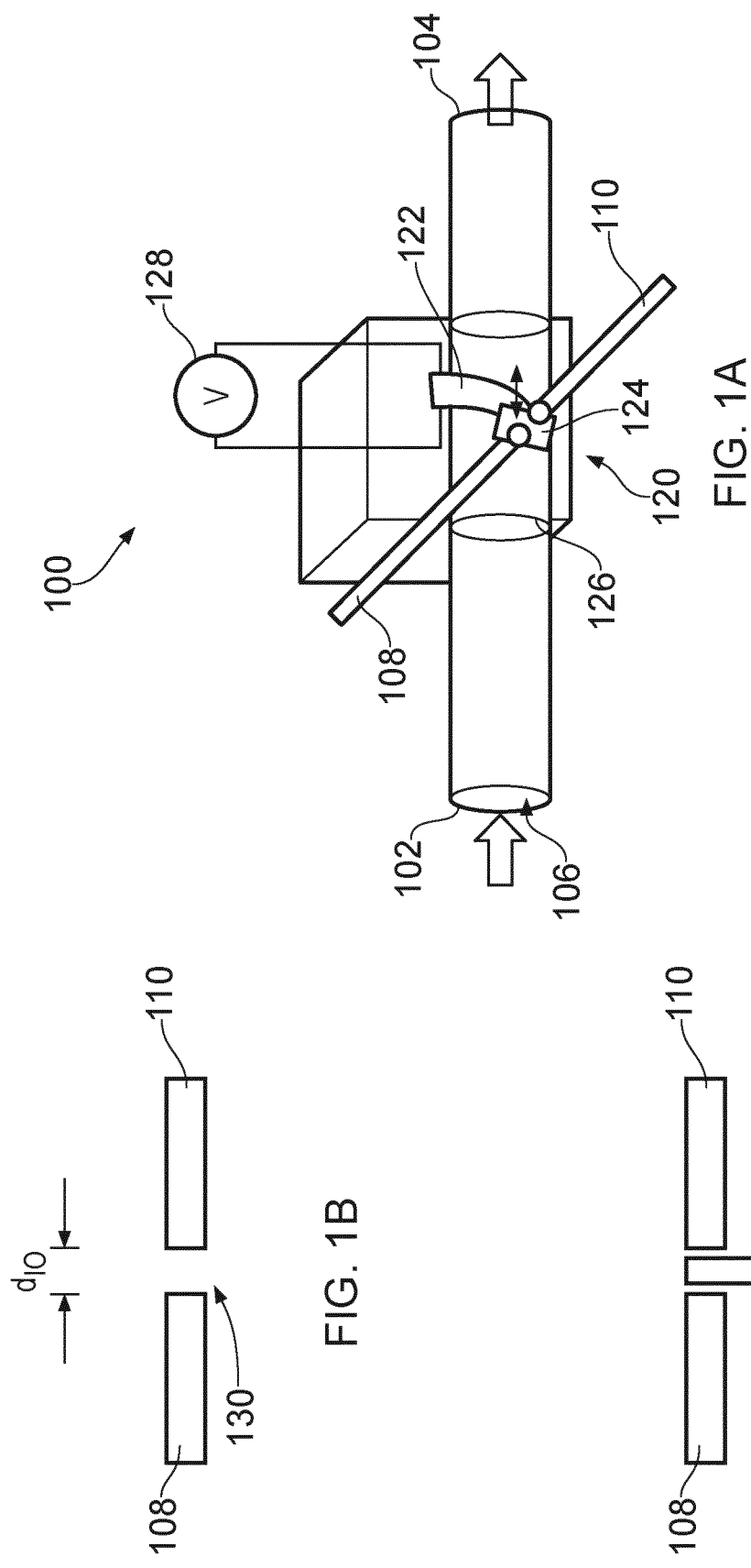
FIG. 1A schematically shows an optical flow cell according to an embodiment of the present invention.
FIG. 1B shows an optical path within the optical flow cell of FIG. 1A in a first operating condition.
FIG. 1C shows an optical path within the optical flow cell of FIG. 1A in a second operating condition.

FIG. 1A shows an optical flow cell 100 according to an embodiment of the present invention.

The optical flow cell 100 may be used for bioprocessing applications, for example in the production of biopharmaceutical products using a bioreactor. For example, optical flow cell 100 may be used for chromatography and/or filtration applications. It may be particularly suited for use with chromatography applications, where rapid changes in concentration occur which require real time monitoring, e.g. during elution steps.

The optical flow cell 100 comprises a fluid inlet 102 and a fluid outlet 104. A fluid flow channel 106 is provided between the fluid inlet 102 and the fluid outlet 104. An output optical waveguide 108 configured to emit light into the fluid flow channel 106 is also provided. The output optical waveguide 108 can comprise a fibre optic waveguide configured to deliver light into the fluid flow channel 106 (e.g. with a diameter of ~400 μm). A collector optical waveguide 110 configured to collect light from said fluid flow channel 106 is also provided. The collector optical waveguide 110 may also comprise a fibre optic waveguide, which may be of a larger diameter than that used for the output optical waveguide 108 (e.g. with a diameter of ~1 mm). The light used may be provided at any desired wavelength (k), such as, for example ultraviolet (UV), visible or infrared wavelengths. In various embodiments, UV light is used since it is readily absorbed by the proteins that are produced in a bioreactor and subsequently used in the manufacture of various biopharmaceutical products. In various embodiments, multiple wavelengths may be applied, either simultaneously or sequentially by sweeping over a range of different wavelengths. The application of different, or of multiple, wavelengths can further increase the measurement range as well as providing datasets having more detailed resolution and a more extensive body of analytical information.

The optical flow cell 100 includes an optical pathlength adjuster 120 for varying the optical pathlength 130 through any fluid that is provided between the output optical waveguide 108 and the collector optical waveguide 110 in the fluid flow channel 106. In this context, the optical pathlength is understood to mean the physical distance travelled in the fluid to be sampled by light.

In this embodiment, the optical pathlength adjuster 120 comprises an optical pathlength modifier 124 provided within the fluid flow channel 106. The pathlength modifier 124 is retractably mounted between the output optical waveguide 108 and the collector optical waveguide 110 in the fluid flow channel 106. In various embodiments, guide rims positioned outside an optical measurement path may also be provided to reduce friction and wear that might be caused between surfaces that could otherwise rub due to poor alignment.

In a retracted position, corresponding to a first operating condition, the optical path length in the fluid is defined by the distance between the output optical waveguide 108 and the collector optical waveguide 110. Once the pathlength modifier 124 is inserted between the output optical waveguide 108 and the collector optical waveguide 110, during a second operating condition, it reduces the optical path length in any fluid flowing therebetween. Accordingly, the optical path length within the fluid can be controlled.

The optical pathlength adjuster 120 comprises an actuation mechanism 122 for moving the optical pathlength modifier 124 within the fluid flow channel 106 between the output optical waveguide 108 and the collector optical waveguide 110. In this case, the actuation mechanism 122 includes a piezo-electric cantilever driver mechanism to which the optical pathlength modifier 124 is attached. The piezo-electric cantilever driver mechanism may be housed in a removable chamber module 126 having external electrical connectors provided thereto. By driving the piezo-electric cantilever driver mechanism using a voltage source 128, e.g. that is electrically coupled to the piezo-electric cantilever driver mechanism by the external electrical connectors, the optical pathlength modifier 124 can be moved between a retracted and an extended position so as to rapidly position the optical pathlength modifier 124 within the fluid flow channel 106. Moreover, such a movement of the optical pathlength modifier 124 can also be used to provide a cleaning action therefor. In various embodiments, a piezo-electric cantilever driver mechanism may be integrated into a chamber (e.g. of a flow cell), which advantageously does not then require provision of flexible sealing or a flow chamber wall section to be provided in-between a displaceable/movable external actuator and the optical pathlength modifier 124.

Other embodiments are feasible that provide a displacement of the optical pathlength modifier. In one embodiment, for example, the optical pathlength modifier may be provided with a magnetic element, hereby allowing its displacement internal to the flow cell by application and alteration of a magnetic field, hereby omitting the need for mechanical actuation and displacement of the pathlength modifier.

The removable chamber module 126 itself comprises a fluid flow channel therein.

Additionally, an output optical waveguide coupler for optically connecting the fluid flow channel to the output optical waveguide 108 and a collector optical waveguide coupler for optically connecting the fluid flow channel to the collector optical waveguide 110 are provided. For bioprocessing applications, single-use components may advantageously be provided. For example, the removable chamber module 126 may be an aseptic single use disposable product and/or include various quick release mechanisms for aseptically connecting the optical flow cell into a bioprocessing system. Moreover, by providing a removable chamber module 126, an optical flow cell may be replaceably provided that can be tailored for a specific application, e.g. in terms of size, flow rate, fluid mixture etc. In traditional, nondisposable setups and applications, a removable chamber module may instead facilitate the servicing or replacement of any worn or broken parts, should the need arise.

Whilst various embodiments described herein provide removable chamber modules for use in an optical flow cell, nevertheless, those skilled in the art will realise that many alternative embodiments would be possible using various non-replaceable components.

The present invention envisages the use of various different types of optical pathlength modifier 124 for modifying the optical path within a fluid sample. For example, the optical pathlength modifier 124 may comprise a substantially planar optical shim 124'. The use of such a substantially planar optical shim 124' is beneficial as it allows accurate control of the thickness thereof, and thus of the optical path and/or the optical path length within the fluid sample.

Various optically transparent materials may also be used to provide an optical pathlength modifier 124, or optical shim such as that denoted 124'. For example, a quartz glass or plastics material may be used. Such materials can be used to accurately manufacture an optical pathlength modifier 124 having a high uniformity of thickness.

FIG. 1B shows an optical path 130 within the optical flow cell 100 of FIG. 1A in a first operating condition with an optical pathlength modifier 124, formed using an optical shim 124', in a retracted position. The optical path 130, which has a first optical pathlength ($P_{fluid0}$) within the fluid, is at a maximum in the first operating condition, and corresponds to the distance ($d_{IO}$) between the output optical waveguide 108 and the collector optical waveguide 110 such that:

$$P_{fluid0} = d_{IO} \qquad \text{Equation 1}$$

FIG. 1C shows an optical path 130 within the optical flow cell 100 of FIG. 1A in a second operating condition with the optical pathlength modifier 124, formed using the optical shim 124', in an inserted position. The optical shim 124' has a uniform thickness of $t_{OPM}$. The optical path 130, which has a second optical pathlength ($P_{fluid1}$) within the fluid, is at a minimum in the second operating condition, and corresponds to the distance ($d_{IO}$) between the output optical waveguide 108 and the collector optical waveguide 110, excluding the path length taken up by the optical shim 124', such that:

$$P_{fluid1} = (d_{IO} - t_{OPM}) \qquad \text{Equation 2}$$

Hence, when the actuation mechanism 122 is activated, the optical path length in the fluid can be switched from $P_{fluid0}$ to $P_{fluid1}$, where:

$$P_{fluid0} > P_{fluid1} \qquad \text{Equation 3}$$

Figure 2:
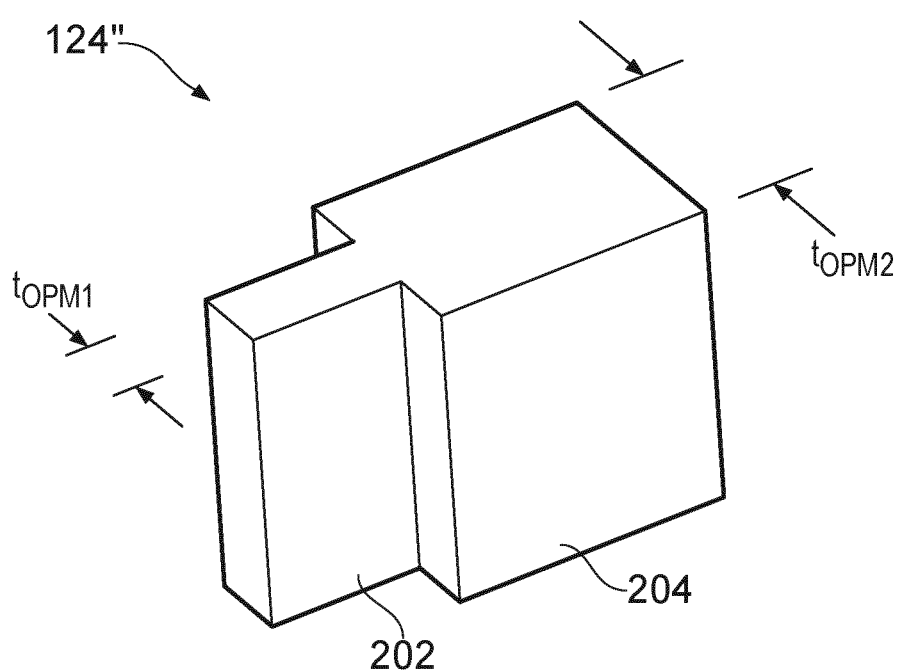
FIG. 2 shows an optical pathlength modifier component for use with an optical pathlength modifier of various embodiments of optical flow cells that are described herein.

FIG. 2 shows an optical pathlength modifier component 124" for use with an optical pathlength modifier 124 of various embodiments of optical flow cells that are described herein. The optical pathlength modifier component 124" consists of a varying thickness profile optical shim. In this instance, the varying thickness profile optical shim can be used to provide two different thicknesses of material within an optical path 130, depending upon the position of the varying thickness profile optical shim between an output optical waveguide 108 and a collector optical waveguide 110.

The optical pathlength modifier component 124" comprises a first substantially planar section 202 having a thickness $t_{OPM1}$, and a second substantially planar section 204 having a thickness $t_{OPM2}$. In this instance:

$$t_{OPM2} > t_{OPM1}, \qquad \text{Equation 4}$$

Hence using this embodiment of an optical pathlength modifier component 124", the optical path length of the fluid in the optical flow cell 100, above, can be modified from $P_{fluid} = d_{IO}$ to:

$$P_{fluid1} = (d_{IO} - t_{OPMi}) \qquad \text{Equation 5}$$

where i corresponds to a sequence/set of integers, and i=(1, 2), thereby giving three possible settings of the optical path length for the fluid in the optical flow cell 100.

Clearly those skilled in the art would be aware that various different optical pathlength modifier components could be provided, having, for example, a stepped profile with multiple thicknesses. For example, the sequence/set of integers i of Equation 5 may run from 1 to 3, 1 to 4, 1 to 5, etc. Such optical pathlength modifier components could also be provided with a curved/tapered profile, e.g. at the edges where transitions in thicknesses occur, so as to streamline fluid flow therearound. Such optical pathlength modifier components may, for example, be formed by using chemical etching, photolithography, additive manufacturing, etc. Additionally, the optical pathlength modifier components, or any other of the components of the optical flow cell, may be provided with anti-reflection (AR) coatings to reduce any undesirable measurement artefacts caused by stray light reflections.

Other embodiments are also envisaged, for example, using optical pathlength modifier components that include a shim wheel that is operable to insert one or more shims of different thickness in order to sweep over two or more optical path lengths within an optical flow cell.

FIG. 3A shows an optical flow cell 300 according to another embodiment of the present invention in a first operating condition.

The optical flow cell 300 comprises a fluid inlet 302 and a fluid outlet 304. A fluid flow channel 306 is provided between the fluid inlet 302 and the fluid outlet 304. An output optical waveguide 308 configured to emit light into the fluid flow channel 306 is also provided. The output optical waveguide 308 can comprise a fibre optic waveguide configured to deliver light into the fluid flow channel 306. A collector optical waveguide 310 configured to collect light from said fluid flow channel 306 is also provided. The collector optical waveguide 310 may also comprise a fibre optic waveguide, which may be of a larger diameter than that used for the output optical waveguide 308. The light used may be provided at any desired wavelength (k), such as, for example ultraviolet (UV), visible or infrared wavelengths. In various embodiments, UV light is used since it is readily absorbed by the proteins that are produced in a bioreactor and subsequently used in the manufacture of various biopharmaceutical products.

The optical flow cell 300 includes an optical pathlength adjuster 320 for varying the optical pathlength 330 through any fluid that is provided between the output optical waveguide 308 and the collector optical waveguide 310 in the fluid flow channel 306.

In this embodiment, the optical pathlength adjuster 320 includes an optical pathlength modifier 324 provided within the fluid flow channel 306 in a fluid chamber 326 of the optical flow cell 300. The pathlength modifier 324 is retractably mounted between the output optical waveguide 308 and the collector optical waveguide 310 in the fluid flow channel 306. In a retracted position, corresponding to a first operating condition, the optical path length in the fluid is defined by the distance between the output optical waveguide 308 and the collector optical waveguide 310 and the refractive index of the fluid therebetween. Once the pathlength modifier 324 is inserted between the output optical waveguide 308 and the collector optical waveguide 310, during a second operating condition, it reduces the optical path length in any fluid flowing therebetween. Accordingly, the optical path length within the fluid can be controlled.

The optical pathlength adjuster 320 also comprises an actuation mechanism 322 for moving the optical pathlength modifier 324 within the fluid flow channel 306 between the output optical waveguide 308 and the collector optical waveguide 310. In this case, the actuation mechanism 322 includes a rocker mechanism 340 connected to the pathlength modifier 324 through a resilient sealed coupling 342. The resilient sealed coupling 342 may comprise rubber or another resilient material, and in various embodiments the resilient sealed coupling 342 may be removable from the optical flow cell 300. For example, thermoplastic elastomers (TPE), such as Santoprene®, Mediprene®, etc., may be used and can be selected such that optimal performance is achieved with/after sterilization/autoclaving and/or gamma irradiation. A distal end of the rocker mechanism 340, external to the fluid flow channel 306, is connected to a solenoid actuator 346. The solenoid actuator 346 can be electrically driven though an electrical connector 348.

The optical pathlength modifier 324 rests in a first retracted position when the solenoid actuator 346 is not electrically activated. In this first operating condition, no part of the optical pathlength modifier 324 lies between the output optical waveguide 308 and the collector optical waveguide 310.

Electrical activation of the solenoid actuator 346 causes the rocker mechanism 340 to pivot and moves the optical pathlength modifier 324 between the output optical waveguide 308 and the collector optical waveguide 310 to effect the second operating condition. Removing the electrical activation then subsequently causes the optical pathlength modifier 324 to return to the first retracted position.

Hence, electrical activation of the solenoid actuator 346 can be used to rapidly position the optical pathlength modifier 324 within the fluid flow channel 306. Moreover, such a movement of the optical pathlength modifier 324 can also be used to provide a cleaning action therefor.

The present invention envisages the use of various different types of optical pathlength modifiers for modifying the optical path within a fluid sample, as are described above, for example. For example, an optical pathlength modifier 324 may comprise a substantially planar optical shim.

In various embodiments, an external actuator, such as the solenoid actuator 346, may be re-usable, while a flow cell as a wetted part may be a single-use part that can be replaced. Such a flow cell may be provided with connections to a fluid path, such as TC connections, barb connections, aseptic connections, etc. Such a flow cell may be pre-sterilized, preferably by gamma irradiation. When integrated into a fluid assembly (e.g. a complete flow kit), the assembly as a whole may also be provided pre-sterilized.

FIG. 3B shows an optical path 330 within the optical flow cell 300 of FIG. 3A in the first operating condition. The optical pathlength modifier 324, which may, for example, be formed using an optical shim 324', is in a retracted position. The optical path 330, which has a first optical pathlength ($P_{fluid0}$) within the fluid, is at a maximum in the first operating condition, and corresponds to the distance ($d_{IO}$) between the output optical waveguide 308 and the collector optical waveguide 310. In this regard, Equation 1 is applicable, but the distance ($d_{IO}$) in this instance may, or may not, be the same as that depicted in FIG. 1B.

FIG. 3C shows the optical flow cell 300 of FIG. 3A in the second operating condition. In this case, the solenoid actuator 346 is being provided with electric power via the electrical connector 348, such that the rocker mechanism 340 has moved to position the optical pathlength modifier 324 between the output optical waveguide 308 and the collector optical waveguide 310.

FIG. 3D shows an optical path 330 within the optical flow cell 300 of FIG. 3C in the second operating condition. An optical shim 324', in an inserted position between the output optical waveguide 308 and the collector optical waveguide 310. The optical shim 324' may have a uniform thickness of $t_{OPM}$. The optical path 330, which has a second optical pathlength ($P_{fluid1}$) within the fluid, is at a minimum in the second operating condition, and corresponds to the distance ($d_{IO}$) between the output optical waveguide 308 and the collector optical waveguide 310, excluding the path length taken up by the optical shim 324'. Similarly to above, Equations 2 and 3 apply, so that when the actuation mechanism 322 is activated, the optical path length in the fluid can be switched from $P_{fluid0}$ to $P_{fluid1}$.

Figure 4:
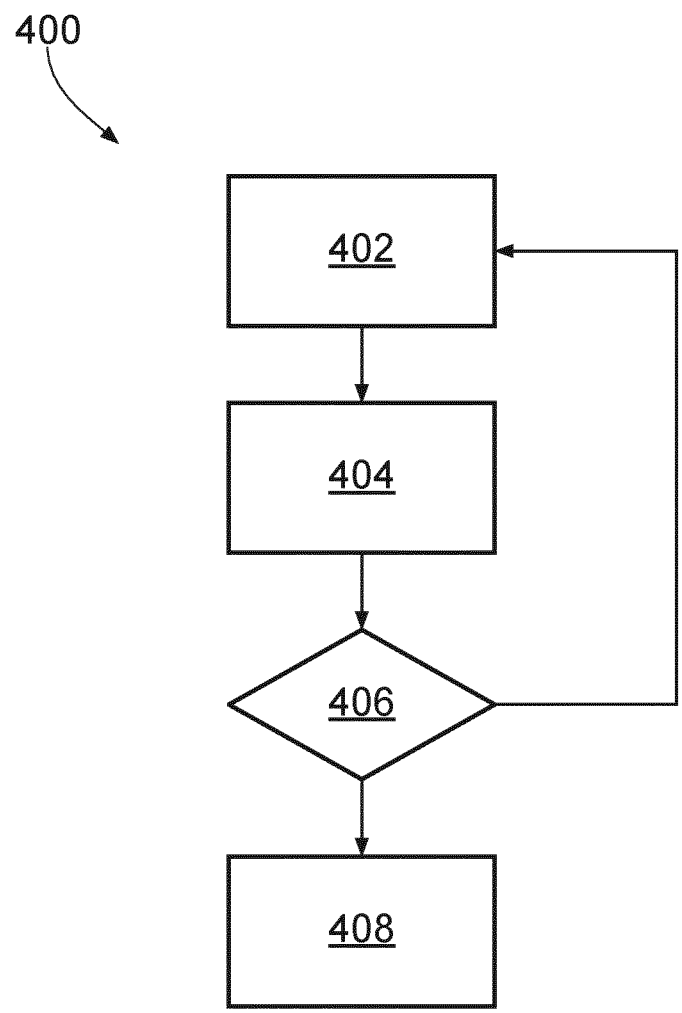
FIG. 4 shows a method for measuring an optical density of a substance within a fluid or fluid mixture using an optical flow cell in accordance with various embodiments of the present invention.

FIG. 4 shows a method 400 for measuring an optical density of a substance within a fluid or fluid mixture using an optical flow cell in accordance with various embodiments of the present invention. The method 400 may, for example, be used in conjunction with the embodiments of the optical flow cells 100, 300 that are described hereinabove.

The method 400 comprises the step 402 of emitting light from an output optical waveguide into a fluid flow channel. The light then travels through an optical path in any fluid or fluid mixture that is within the flow channel. Such light is then collected, at step 404, from the fluid flow channel using a collector optical waveguide.

Based upon the intensity and/or spectral content of the collected light, the method 400 then proceeds to determine, at step 406, a first optical density of the substance. When the determined first optical density lies outside of a linear operating range of the optical flow cell, as determined at step 406, an optical path length within the fluid or fluid mixture in a fluid flow channel is changed from a value corresponding to the first optical density to a value corresponding to a second optical density lying within said linear operating range. For example, this may be achieved by reducing the optical path length within the fluid or fluid mixture using an optical pathlength adjuster, as herein described, by way of moving the optical pathlength modifier into a position between the output optical waveguide and the collector optical waveguide within the fluid flow channel.

Once a suitable value of the first optical density or the second optical density, lying within the linear operating range, has been determined, the method 400 completes with a last step 408 of using that value as a determinant value for the optical density of the substance within a fluid or fluid mixture. Such a determinant value for the optical density of the substance within a fluid or fluid mixture may thus provide an indication of the presence of and/or concentration of a substance in a bioprocess fluid or fluid mixture flowing through the fluid flow channel.

Hence, using the method 400 of FIG. 4 it is possible to provide for real-time decision making in relation to shifting of path lengths depending on the absorbance values and linearity.

An alternative method, in which a pathlength is continuously shifted, irrespective of the measured absorbance, with subsequent selection of the appropriate signal from among the various signals obtained with the different path lengths, is also envisaged. For example, values falling within a linear measurement range may be appropriately sorted. In some applications, it may even be desirable to collect, process and/or evaluate data obtained for multiple pathlengths continuously, and thus said continuous shifting of pathlength may be preferable.

Various embodiments may also use a technique in which a sweep is made over multiple different wavelengths. Such a technique may also be combined with one that involves sweeping over different path lengths. It is also to be understood that there are various ways for collecting and processing data, which can involve either continuously sweeping over pathlengths and/or wavelengths, or which involve taking decisions on scanning profiles in dependence of actual measurements, which then may change over time.

Various embodiments have been described above. These may be constructed at least in part using polymer materials such as polypropylene, polyethylene, peek, Topas®, etc. for any substantially rigid components or sub-components thereof. Additionally, various embodiments may be provided with aseptic fluid connections. These can be of a quick release design.

The present invention also envisages various embodiments that provided a fixed sample volume (such as a cuvette, e.g. for use in a photometer), where the optical path length in the cuvette may be altered by inserting a shim element/optical pathlength modifier of constant or varying thickness.

Those skilled in the art will also realise that there may be systematic effects to be accounted for when finalising the design of the flow cell, e.g. for any calibrations required, as well as in the analysis and interpretation of measurement results. Such systematic effects may comprise non-ideal properties of optical elements, such as reflections, straylight, light losses, refractive indices etc.

One further advantage of certain aspects and embodiments of the present invention is that the positioning and/or alignment accuracy of the optical pathlength modifier is not necessarily critical, rather it is the accuracy in control of the thickness of the optical components that form the optical pathlength modifier that defines a reduction in the optical path length within the fluid.

Yet another advantage of various aspects and embodiments of the present invention is that an optical flow cell can be made which is compact and which has only a small footprint and holdup volume.

Yet another advantage of various aspects and embodiments of the present invention is that an optical flow cell can be made which is tolerant to high fluid pressure. This may be so especially if the actuation of the optical pathlength modifier is achieved within a fixed housing, such as by using a piezo-electric cantilever driver mechanism or (electro-)magnetic actuation, for example.

Moreover, usability may be greatly improved as, in various embodiments, only one fibre optic connection needs to be made. This makes such embodiments particularly well-suited for use in single-use devices.

Finally, it should be understood that the invention is not limited to the embodiments described herein, but also relates to and incorporates all embodiments falling within the scope of the appended claims.

The invention claimed is:

1. An optical flow cell for bioprocessing comprising:
a fluid inlet;
a fluid outlet;
a fluid flow channel provided between said fluid inlet and said fluid outlet;
an output optical waveguide configured to emit light into said fluid flow channel;
a collector optical waveguide configured to collect light from said fluid flow channel; and
an optical pathlength adjuster for varying the optical pathlength between said output optical waveguide and said collector optical waveguide;
wherein the optical pathlength adjuster comprises a retractable optical pathlength modifier provided within the fluid flow channel; and
wherein the optical pathlength adjuster is at least partially provided within a removable chamber module.

2. The optical flow cell of claim 1, wherein the optical pathlength adjuster comprises an actuation mechanism for moving the retractable optical pathlength modifier within the fluid flow channel between said output optical waveguide and said collector optical waveguide.

3. The optical flow cell of claim 2, wherein the actuation mechanism comprises a piezo-electric cantilever driver mechanism.

4. The optical flow cell of claim 2, wherein the actuation mechanism comprises a rocker mechanism connected to the retractable optical pathlength modifier through a resilient sealed coupling, and wherein a distal end of the rocker mechanism, located external to the fluid flow channel, is connected to a solenoid actuator.

5. The optical flow cell of claim 1, wherein the retractable optical pathlength modifier comprises a substantially planar optical shim.

6. The optical flow cell of claim 1, wherein the retractable optical pathlength modifier comprises a varying thickness profile optical shim.

7. The optical flow cell of claim 1, wherein the retractable optical pathlength modifier comprises a quartz glass or plastics material.

8. The optical flow cell of claim 1, wherein at least one component thereof is sterilised.

9. A removable chamber module for use in the optical flow cell of claim 1, said removable chamber module comprising a fluid flow channel therein, an output optical waveguide coupler for optically connecting the fluid flow channel to the output optical waveguide and a collector optical waveguide coupler for optically connecting the fluid flow channel to the collector optical waveguide, the removable chamber module further comprising a retractable optical pathlength modifier and an optical pathlength modifier actuator provided in the channel, said retractable optical pathlength modifier actuator being operable to move said retractable optical pathlength modifier within the channel.

10. The removable chamber module of claim 9, wherein at least one component thereof is sterilised.

11. A method for measuring an optical density of a substance within a fluid or fluid mixture using an optical flow cell comprising a retractable optical pathlength modifier, the method comprising:
  i) emitting light from an output optical waveguide into a fluid flow channel;
  ii) collecting light from the fluid flow channel using a collector optical waveguide;
  iii) determining a first optical density of the substance based upon said collected light; and
  iv) if said determined first optical density lies outside of a linear operating range of the optical flow cell, then changing an optical path length within the fluid or fluid mixture in the fluid flow channel so as to change a value of the first optical density to a value corresponding to a second optical density lying within said linear operating range; or
  v) continuously varying an optical path length, using a retractable optical pathlength modifier, within the fluid or fluid mixture in the fluid flow channel to provide a set of data measurements, and selecting a best data measurement from said set of data measurements corresponding to the optical density.

12. The method of claim 11, wherein changing the optical path length within the fluid or fluid mixture within the fluid flow channel comprises reducing the optical path length within the fluid or fluid mixture.

13. The method of claim 12, wherein reducing the optical path length comprises:
  vi) moving the retractable optical pathlength modifier into a position between the output optical waveguide and the collector optical waveguide within the fluid flow channel.

14. The method of claim 11, further comprising:
  vii) using the value of the first optical density or the value corresponding to the second optical density lying within the linear operating range as a determinant value for the optical density of the substance within a fluid or fluid mixture.

15. The method of claim 14, wherein the determinant value for the optical density of the substance within a fluid or fluid mixture provides an indication of the presence of and/or concentration of a substance in a bioprocess fluid or fluid mixture flowing through the fluid flow channel.

16. The method of claim 11, further comprising the step of sterilising at least one component of the optical flow cell.

* * * * *